United States Patent [19]
Pripps et al.

[11] Patent Number: 5,752,715
[45] Date of Patent: May 19, 1998

[54] AIRBAG MODULE DIFFUSER

[75] Inventors: Steven R. Pripps, North Ogden; Daniel L. Steimke, Ogden, both of Utah; Randy K. Jones, Stuttgart, Germany

[73] Assignee: Morton International, Inc., Chicago, Ill.

[21] Appl. No.: 800,774

[22] Filed: Feb. 14, 1997

[51] Int. Cl.$^6$ ................................................ B60R 21/26
[52] U.S. Cl. .................................... 280/740; 280/732
[58] Field of Search ............................. 280/740, 732, 280/728.2, 736, 737, 741, 742, 728.1

[56] References Cited

U.S. PATENT DOCUMENTS

| | | | |
|---|---|---|---|
| 5,069,480 | 12/1991 | Good | 280/732 |
| 5,308,108 | 5/1994 | Rion | 280/728.2 |
| 5,340,147 | 8/1994 | Fontecchio et al. | 280/740 |
| 5,458,364 | 10/1995 | Mueller et al. | 280/740 |
| 5,470,105 | 11/1995 | Rose et al. | 280/740 |
| 5,634,657 | 6/1997 | Rose et al. | 280/740 |

*Primary Examiner*—Peter C. English
*Attorney, Agent, or Firm*—George W. Rauchfuss, Jr.

[57] ABSTRACT

A diffuser for uniformly diffusing inflation gas from an elongated inflator having inflation exhaust ports at only one end into an airbag cushion. The diffuser having a longitudinal length extending between opposing first and second diffuser ends. A first end section extends from the first diffuser end, is positionable over the inflation exhaust ports of the inflator and defines at least one diffuser vent opening. An intermediate section extends from the first end section and defines a plurality of diffuser vent openings equal or progressively larger further from the first end section. A second end section extends from the intermediate section to the second diffuser end and defines a single diffuser vent opening. Each of the plurality of diffuser vent openings of the intermediate section is equal or larger than the at least one diffuser vent opening of the first end section and equal or smaller than the single diffuser vent opening of the second end section. All of the diffuser vent openings form a total diffuser vent area of the diffuser. The first end section has a diffuser vent area equal to between about eight and about seventeen percent of the total diffuser vent area, while the intermediate section has a diffuser vent area equal to between about fifty-six and about seventy-nine percent of the total diffuser vent area, and the second end section has a diffuser vent area equal to between about thirteen and about twenty-seven percent of the total diffuser vent area.

19 Claims, 5 Drawing Sheets

AIRBAG MODULE DIFFUSER

FIELD OF THE INVENTION

The present invention relates to an airbag module and, more particularly, to a diffuser for use with an airbag module.

BACKGROUND OF THE INVENTION

An airbag module is employed in a vehicle, particularly an automobile, for protecting an occupant against injury by deploying an inflated airbag cushion to physically restrain the occupant's body when the vehicle encounters a collision. A passenger side airbag module is normally positioned in a dashboard of a vehicle, in front of the front passenger seat. Some passenger side airbag modules include a trough-shaped module housing (or reaction canister) containing an airbag cushion, an inflator for inflating the airbag cushion upon receiving a signal from a remote collision sensor, and a diffuser separating the airbag cushion from the inflator. The diffuser defines diffuser vent openings for diffusing inflation gas from the inflator into the airbag cushion. The diffuser can be unitarily formed with the reaction canister.

The inflators in passenger side airbag modules are usually elongated and, depending on the type of inflator, define inflation exhaust ports at only one end thereof. Inflation gas exiting the inflator from only one end thereof, however, can cause uneven or skewed inflation of the airbag cushion. Skewed inflation is unwanted because it can cause the top of the airbag cushion to strike the occupant before being fully inflated. Skewed inflation can also cause the airbag cushion to push the occupant to the side of the inflating airbag cushion so that the occupant does not receive the protection of the inflated airbag cushion. Skewed inflation additionally places severe stress on the airbag cushion. In contrast, equal or even inflation of the airbag cushion allows the airbag cushion to be fully inflated and correctly positioned before an occupant is carried, by the force of deceleration caused by a collision of the vehicle, into the fully inflated and correctly positioned airbag cushion.

It would be useful, therefore, to provide a diffuser that substantially uniformly diffuses inflation gas, exiting inflation exhaust ports defined by one end of an elongated inflator, into an airbag cushion to encourage even inflation of the airbag cushion.

SUMMARY OF THE INVENTION

A general object, therefore, of the present invention is to provide a new and improved passenger side airbag module.

A more specific object of the present invention is to provide a new and improved diffuser for use with a passenger side airbag module.

Another object of the present invention is to provide a diffuser that substantially uniformly diffuses inflation gas, exiting inflation exhaust ports defined by one end of an elongated inflator, into an airbag cushion to encourage even inflation of the airbag cushion.

In meeting one or more of the above objects, the present invention provides a diffuser for substantially uniformly diffusing inflation gases from an elongated inflator having inflation exhaust ports at only one end thereof into the mouth of an inflatable airbag cushion. The diffuser includes opposing first and second diffuser ends. A first end section extends from the first diffuser end, is positionable over the inflation exhaust ports of the elongated inflator and defines at least one diffuser vent opening. An intermediate section extends from the first end section and defines a plurality of diffuser vent openings, with each of the plurality of diffuser vent openings being equal or larger than a preceding diffuser vent opening closer to the first end section. A diffuser vent opening of the plurality of diffuser vent openings of the intermediate section closest to the first end section is equal or larger than the at least one diffuser vent opening of the first end section. A second end section extends from the intermediate section to the second diffuser end and defines a single diffuser vent opening equal to or larger than a diffuser vent opening of the plurality of diffuser vent openings of the intermediate section closest to the second end section.

The at least one diffuser vent opening of the first end section, the plurality of diffuser vent openings of the intermediate section, and the single diffuser vent opening of the second end section form a total diffuser vent area of the diffuser. The at least one diffuser vent opening of the first end section has a diffuser vent area equal to between about eight and about seventeen percent of the total diffuser vent area. The plurality of diffuser vent openings of the intermediate section combined have a diffuser vent area equal to between about fifty-six and about seventy-nine percent of the total diffuser vent area. The single diffuser vent opening of the second end section has a diffuser vent area equal to between about thirteen and about twenty-seven percent of the total diffuser vent area.

According to one preferred aspect of the present invention, a ratio of the diffuser vent area of the single diffuser vent opening of the second end section to the diffuser vent area of the at least one diffuser vent opening of the first end section is equal to at least one and a half.

According to another aspect of the present invention, the at least one diffuser vent opening of the first end section comprises at least two diffuser vent openings, with each said at least two diffuser vent openings being equal or larger than a preceding diffuser vent opening closer to the first diffuser end.

According to an additional aspect of the present invention, the intermediate section is longer than the first end section and longer than the second end section.

According to one embodiment of the present invention, the diffuser vent area of the at least one diffuser vent opening of the first end section equals about seventeen percent of the total diffuser vent area, the diffuser vent area of the plurality of diffuser vent openings of the intermediate section equals about fifty-seven percent of the total diffuser vent area, and the diffuser vent area of the single diffuser vent opening of the second end section equals about twenty-six percent of the total diffuser vent area.

According to another embodiment of the present invention, the diffuser vent area of the at least one diffuser vent opening of the first end section equals about fourteen percent of the total diffuser vent area, the diffuser vent area of the plurality of diffuser vent openings of the intermediate section equals about sixty-five percent of the total diffuser vent area, and the diffuser vent area of the single diffuser vent opening of the second end section equals about twenty-one percent of the total diffuser vent area.

According to an additional embodiment of the present invention, the diffuser vent area of the at least one diffuser vent opening of the first end section equals about fourteen percent of the total diffuser vent area, the diffuser vent area of the plurality of diffuser vent openings of the intermediate section equals about sixty percent of the total diffuser vent area, and the diffuser vent area of the single diffuser vent opening of the second end section equals about twenty-six percent of the total diffuser vent area.

According to a further embodiment of the present invention, the diffuser vent area of the at least one diffuser vent opening of the first end section equals about twelve percent of the total diffuser vent area, the diffuser vent area of the plurality of diffuser vent openings of the intermediate section equals about sixty-nine percent of the total diffuser vent area, and the diffuser vent area of the single diffuser vent opening of the second end section equals about nineteen percent of the total diffuser vent area.

According to still another embodiment of the present invention, the diffuser vent area of the at least one diffuser vent opening of the first end section equals about twelve percent of the total diffuser vent area, the diffuser vent area of the plurality of diffuser vent openings of the intermediate section equals about seventy-four percent of the total diffuser vent area, and the diffuser vent area of the single diffuser vent opening of the second end section equals about fourteen percent of the total diffuser vent area.

According to yet another embodiment of the present invention, the diffuser vent area of the at least one diffuser vent opening of the first end section equals about eight percent of the total diffuser vent area, the diffuser vent area of the plurality of diffuser vent openings of the intermediate section equals about seventy-six percent of the total diffuser vent area, and the diffuser vent area of the single diffuser vent opening of the second end section equals about sixteen percent of the total diffuser vent area.

The present invention also provides an airbag module including the diffuser defined above. The airbag module further includes an elongated, generally trough-shaped module housing, a folded, inflatable airbag cushion and an elongated inflator for providing inflation gas for inflating the airbag cushion.

The module housing has a bottom wall, and a pair of opposing endwalls and a pair of sidewalls extending upwardly from the bottom wall and forming an open top. The airbag cushion has an open mouth for receiving inflation gas from the inflator, and the airbag cushion is mounted within the module housing adjacent the open top of the module housing. The elongated inflator extends between the opposing endwalls of the module housing adjacent the bottom wall and defines a plurality of inflation exhaust ports at a first end thereof.

The diffuser is positioned within the module housing above the inflator and below the open mouth of the folded, inflatable airbag cushion. The diffuser extends between the opposing sidewalls of the module housing and the first and second diffuser ends extend between the opposing endwalls of the module housing so that the diffuser encloses the inflator within the module housing. The diffuser substantially uniformly diffuses inflation gas from the inflation exhaust ports defined by the first end of the elongated inflator into the mouth of the inflatable airbag cushion.

According to one aspect of the present invention, the inflator of the airbag module is a hybrid inflator.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
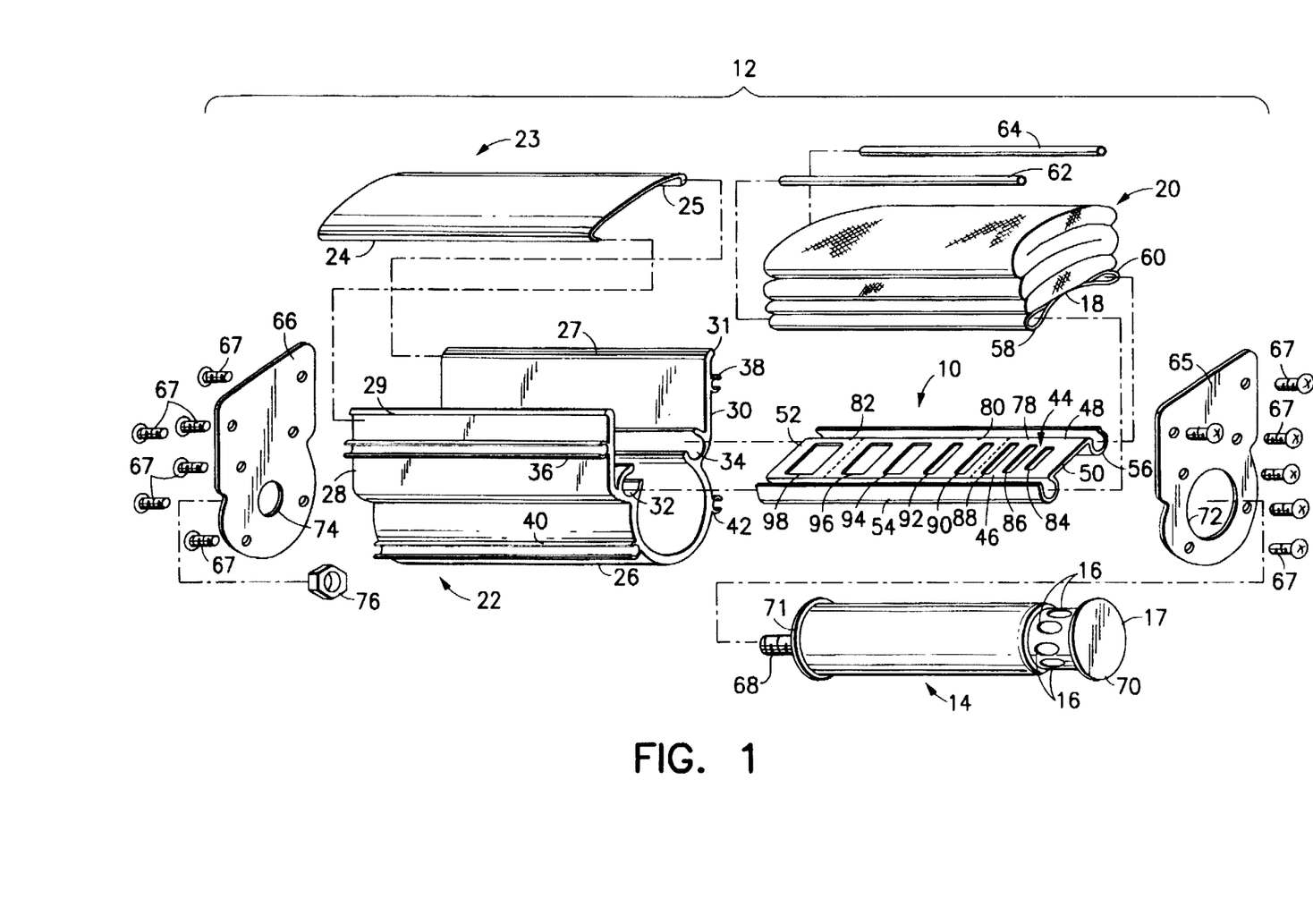
FIG. 1 is an exploded perspective side view of an airbag module including a diffuser having diffuser vent openings according to the present invention.

Referring first to FIG. 1, the present invention provides a diffuser 10 for use as part of a passenger-side airbag module 12. The diffuser 10 uniformly diffuses inflation gas from an elongated inflator 14 having inflation exhaust ports 16 at only a first end 17 thereof into a mouth 18 of an inflatable airbag cushion 20, thereby encouraging even inflation of the airbag cushion.

In addition to the diffuser 10, the inflator 14 and the airbag cushion 20, the airbag module 12 includes a module housing 22 and a cushion cover 23. The module housing 22 (also referred to in the art as a reaction canister) is generally trough-shaped and has a semi-tubular bottom wall 26, a first sidewall 28 and an opposing second sidewall 30 forming a pair of open ends and an open top 27. Two opposed, parallel mounting channels 32,34 are unitary, respectively, with the first and the second sidewalls 28,30. Two opposed, parallel fastener channels 36,38 are unitary with the first and the second sidewalls 28,30, and two opposed, parallel fastener channels 40,42 are unitary with the bottom wall. The module housing 22 can made from a suitable lightweight and rigid material such as a metal or an engineering plastic with or without reinforcement fillers, for example. Preferably the module housing 22 is made from aluminum and is formed by being extruded, or the module housing is made of a suitable plastic and injection molded.

The diffuser 10 includes a flat, rectangular diffuser shelf 44 having a pair of opposite diffuser side edges 46,48 and a pair of opposite first and second diffuser ends 50,52. The diffuser 10 also includes a pair of diffuser side tubes 54,56 extending from the diffuser side edges 46,48 of the diffuser shelf 44.

The diffuser 10 is mounted within the module housing 22 with the diffuser side tubes 54,56 received within the parallel mounting channels 32,34 formed in the first and the second sidewalls 28,30 of the module housing. The inflatable airbag cushion 20 is folded and the mouth 18 of the airbag cushion is rectangular and partially formed by opposing cushion tubes 58,60. The airbag cushion 20 is mounted within the module housing 22 above the diffuser 10 and adjacent the open top 27 of the module housing, with cushion rods 62,64 securing the cushion tubes 58,60 of the airbag cushion within the diffuser side tubes 54,56, as is known in the art. A first and a second endplate 65,66 close the open ends of the module housing 22 (thereby acting as endwalls of the module housing) with the diffuser shelf 44 extending between the endplates. The airbag module 12 is secured together by a plurality of screws 67 which extend through the first and the second endplates 65,66 into the fastener channels 36,38,40,42 formed in the module housing 22 and also the ends of the cushion rods 62,64, which can be threaded. The cushion cover 23 includes opposing curled-under side edges 24,25 which catch on outwardly curled top edges 29,31 of the first and second sidewalls 28,30, securing the cushion cover to the module housing 22 and closing the open top 27 of the module housing. The cushion cover 23 protects the folded airbag cushion 20 and is rupturable upon inflation of the airbag cushion.

The airbag inflator 14 provides inflation gas for inflating the airbag cushion 20 and is a hybrid type of inflator generally containing compressed inert gas and an initiator, as is known in the art. The inflator 14 is elongated and defines the inflation exhaust ports 16 at only the first end 17 thereof. The inflator 14 also includes a mounting stud 68 extending from a second end 71 of the inflator and a mounting flange 70 at the first end 17 of the inflator. The inflator 14 extends through an inflator-receiving opening 72 in the first endplate 65 and is received within the module housing 22 adjacent the bottom wall 26, between the endplates 65,66 and below the diffuser 10, with the diffuser shelf 44 cooperating with the reaction canister and the endplates to enclose or surround the inflator. The mounting flange 70 of the inflator 14 catches the first endplate 65 around the inflator-receiving opening 72 and the mounting stud 68 extends through a stud hole 74 in the second endplate 66 and is fastened with a nut 76 to secure the inflator within the module housing 22.

Figure 2:
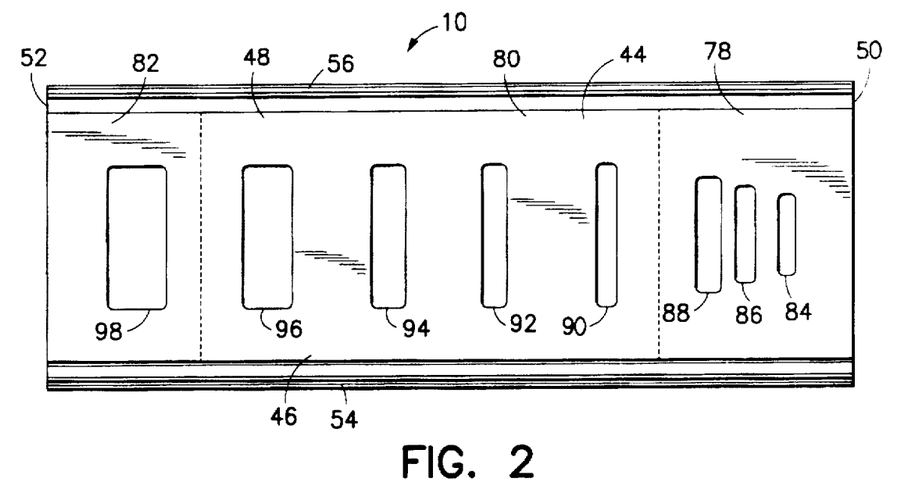
FIG. 2 is a top plan view of the diffuser of FIG. 1.

Referring also to FIG. 2, the diffuser 10 of the present invention is shown independent of the airbag module 12. As mentioned above, the diffuser 10 substantially uniformly diffuses inflation gas from the elongated inflator 14 having the inflation exhaust ports 16 at only one end 17 thereof into the mouth 18 of the inflatable airbag cushion 20, thereby encouraging even inflation of the airbag cushion. The diffuser shelf 44 includes a first end section 78 extending from the first diffuser end 50 to an intermediate section 80, which extends to a second end section 82 opposite the first end section and extending to the second diffuser end 52. Although the first end section 78, the intermediate section 80 and the second end section 82 are unitary, for purposes of illustration they are shown divided by broken lines. The diffuser shelf 44 has a longitudinal (or straight line) length extending between the first diffuser end 50 and the second diffuser end 52 and through the first end section 78, the intermediate section 80 and the second end section 82, and has a width extending between the opposite diffuser side edges 46,48. As shown, the intermediate section 80 is longer than the first end section 78, and longer than the second end section 82.

The first end section 78 of the diffuser 10 is positioned over the inflation exhaust ports 16 of the elongated inflator 14 and defines first, second and third diffuser vent openings 84,86,88. The first diffuser vent opening 84 is spaced from the first diffuser end 50 by about 0.7 inch (17.8 mm) and has a length (with reference to the longitudinal length of the diffuser extending between the first and second diffuser ends 50,52) of about 0.22 inch (5.6 mm) and a width (with reference to the width of the diffuser extending between the opposite diffuser side edges 46,48) of about 1.0 inch (25.4 mm). The second diffuser vent opening 86 is spaced from the first diffuser end 50 by about 1.2 inches (30.5 mm) and has a length of about 0.22 inch (5.6 mm) and a width of about 1.2 inches (30.5 mm). The third diffuser vent opening 88 is spaced from the first diffuser end 50 by about 1.6 inches (40.6 mm) and has a length of about 0.22 inch (5.6 mm) and a width of about 1.4 inches (35.6 mm).

The first end section 78 can define more or less than three diffuser vent openings but must define at least one diffuser vent opening. In addition, as shown, each of the diffuser vent openings 84,86,88 defined by the first end section 78 must be equal or larger than a preceding diffuser vent opening closer to the first diffuser end 50.

The intermediate section 80 of the diffuser 10 defines fourth, fifth, sixth and seventh diffuser vent openings 90,92, 94,96. The fourth diffuser vent opening 90 is spaced from the first diffuser end 50 by about 2.9 inches (73.7 mm) and has a length of about 0.22 inch (5.6 mm) and a width of about 1.74 inches (44.2 mm). The fifth diffuser vent opening 92 is spaced from the first diffuser end 50 by about 4.2 inches (106.7 mm) and has a length of about 0.3 inch (7.6 mm) and a width of about 1.74 inches (44.2 mm). The sixth diffuser vent opening 94 is spaced from the first diffuser end 50 by about 5.5 inches (139.7 mm) and has a length of about 0.4 inch (10.1 mm) and a width of about 1.74 inches (44.2 mm). The seventh diffuser vent opening 96 is spaced from the first diffuser end 50 by 6.9 inches (175.3 mm) and has a length of about 0.6 inch (15.2 mm) and a width of about 1.74 inches (44.2 mm).

The intermediate section 80 can define more or less than four diffuser vent openings but must define a plurality of diffuser vent openings. In addition, each of the diffuser vent openings 90,92,94,96 defined by the intermediate section 80 must be equal or larger than a preceding diffuser vent opening closer to the first end section 78. Also, the diffuser vent opening 90 of the intermediate section 80 nearest the first end section 78 (the first or smallest diffuser vent opening of the intermediate section) must be equal to or larger than the largest diffuser vent opening 88 of the first end section.

The second end section 82 of the diffuser 10 defines an eighth diffuser vent opening 98. The eighth diffuser vent opening 98 is spaced from the first diffuser end 50 by 8.4 inches (213.4 mm) and has a length of about 0.7 inch (17.8 mm) and a width of about 1.74 inches (44.2 mm). The second end section 82 must define only one diffuser vent opening. Also, the diffuser vent opening 98 of the second end section 82 must be equal to or larger than the diffuser vent opening 96 of the intermediate section 80 nearest the second end section (the last or largest diffuser vent opening of the intermediate section).

All of the diffuser vent openings 84,86,88,90,92,94,96,98 form a total diffuser vent area of the diffuser 10 equal to about 4.65 square inches (3000 square mm). The first, second and third diffuser vent openings 84,86,88 of the first end section 78 combined have a diffuser vent area equal to about 17% or 0.79 square inch (510 square mm). The fourth, fifth, sixth and seventh diffuser vent openings 90,92,94,96 of the intermediate section 80 combined have a diffuser vent area equal to about 57% or 2.6 square inch (1677 square mm). The eighth diffuser vent opening 98 of the second end section 82 has a diffuser vent area equal to about 26% or 1.22 square inches (787 square mm).

The first, second and third diffuser vent openings 84,86,88 of the first end section 78 combined can have a diffuser vent area equal to less than about seventeen percent (17%) but must equal between about eight and about seventeen percent (8–17%) of the total diffuser vent area of the diffuser 10. The fourth, fifth, sixth and seventh diffuser vent openings 90,92, 94,96 of the intermediate section 80 combined can have a diffuser vent area greater than about fifty-six percent (56%)

but must equal between about fifty-six and about seventy-nine percent (56–79%) of the total diffuser vent area. The eighth diffuser vent opening 98 of the second end section 82 can have a diffuser vent area less than twenty-six percent (26%) but must equal between about thirteen and about twenty-seven percent (13–27%) of the total diffuser vent area. In addition, a ratio of the diffuser vent area of the single diffuser vent opening 98 defined by the second end section 82 to the combined diffuser vent area of the first, second and third diffuser vent openings 84,86,88 defined by the first end section 78 is equal to at least about one and a half (1.5).

Figure 3:
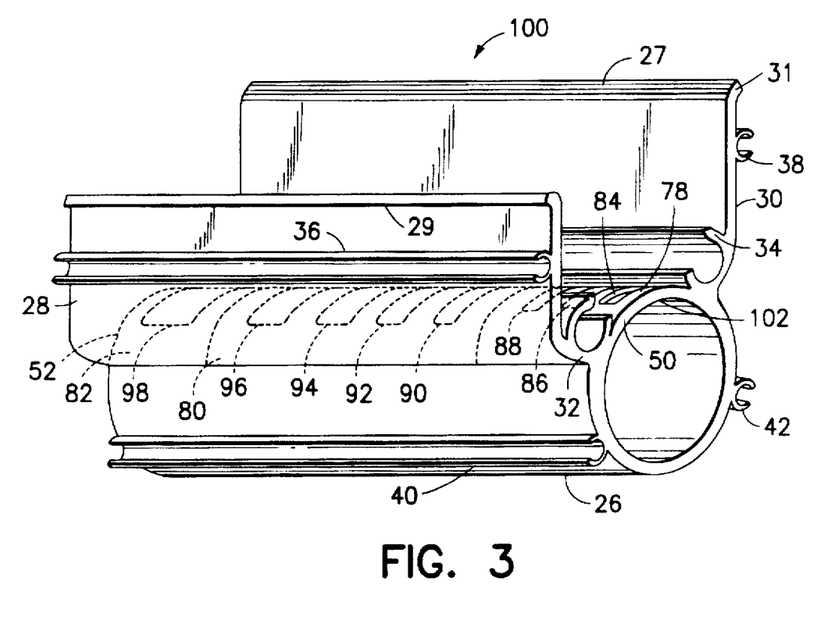
FIG. 3 is a perspective side view of a reaction canister including a unitary diffuser according to the present invention having the diffuser vent openings of FIGS. 1 and 2.

Referring to FIG. 3, a module housing 100 having a unitary diffuser 102 according to the present invention is shown. The module housing 100 is similar to the module housing 22 of FIG. 1 and elements which are the same have the same reference numeral. The unitary diffuser 102 is also similar to the diffuser 10 of FIGS. 1 and 2 and elements which are the same have the same reference numeral. The module housing 100 can be made from a suitable lightweight and rigid material such as a metal or an engineering plastic with or without reinforcement fillers, for example. Preferably the module housing 100 along with the unitary diffuser 102 is made from aluminum and is formed by being extruded and the diffuser vent openings 84,86,88,90,92,94, 96,98 are then punched out of the diffuser. Alternatively, the module housing 100 and unitary diffuser 102 can be made of a suitable plastic and injection molded.

Figure 4:
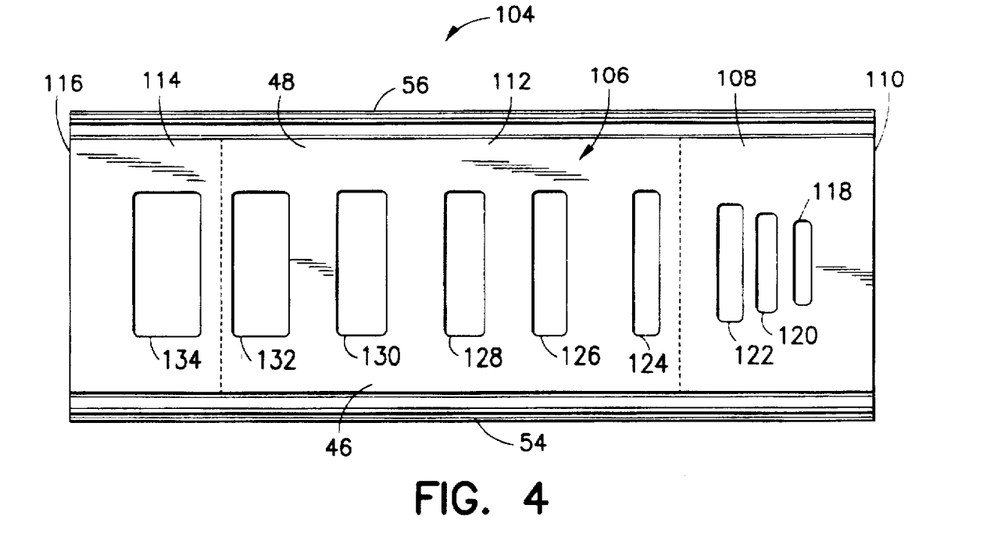
FIG. 4 is a top plan view of another diffuser according to the present invention.

Referring to FIG. 4, another diffuser 104 according to the present invention is shown. The diffuser 104 is similar to the diffuser 10 of FIGS. 1 and 2 and elements which are the same have the same reference numerals. A diffuser shelf 106 of the diffuser 104 includes a first end section 108 extending from a first diffuser end 110 to an intermediate section 112, which extends to a second end section 114 opposite the first end section and extending to a second diffuser end 116.

The first end section 108 of the diffuser 104 is positionable over the inflation exhaust ports 16 of the elongated inflator 14 and defines first, second and third diffuser vent openings 118,120,122. The first diffuser vent opening 118 is spaced from the first diffuser end 110 by 0.7 inch (17.8 mm) and has a length of about 0.25 inch (6.4 mm) and a width of about 1.2 inches (30.5 mm). The second diffuser vent opening 120 is spaced from the first diffuser end 110 by 1.2 inches (30.5 mm) and has a length of about 0.25 inch (6.4 mm) and a width of about 1.4 inches (35.6 mm). The third diffuser vent opening 122 is spaced from the first diffuser end 110 by 1.6 inches (40.6 mm) and has a length of about 0.25 inch (6.4 mm) and a width of about 1.6 inches (40.5 mm).

The intermediate section 112 of the diffuser 10 defines fourth, fifth, sixth, seventh and eighth diffuser vent openings 124,126,128,130,132. The fourth diffuser vent opening 124 is spaced from the first diffuser end 110 by 2.6 inches (66.0 mm) and has a length of about 0.3 inch (7.6 mm) and a width of about 1.9 inches (48.0 mm). The fifth diffuser vent opening 126 is spaced from the first diffuser end 110 by 3.7 inches (94.0 mm) and has a length of about 0.4 inch (10.2 mm) and a width of about 1.9 inches (48.0 mm). The sixth diffuser vent opening 128 is spaced from the first diffuser end 110 by 4.7 inches (119.4 mm) and has a length of about 0.5 inch (12.7 mm) and a width of about 1.9 inches (48.0 mm). The seventh diffuser vent opening 130 is spaced from the first diffuser end 110 by 5.9 inches (149.9 mm) and has a length of about 0.6 inch (15.2 mm) and a width of about 1.9 inches (48.0 mm). The eighth diffuser vent opening 132 is spaced from the first diffuser end 110 by 7.1 inches (180.3 mm) and has a length of about 0.7 inch (17.8 mm) and a width of about 1.9 inches (48.0 mm).

The second end section 114 of the diffuser 104 defines a ninth diffuser vent opening 134. The ninth diffuser vent opening 134 is spaced from the first diffuser end 110 by 8.2 inches (208.3 mm) and has a length of about 0.8 inch (20.3 mm) and a width of about 1.9 inches (48.0 mm).

All of the diffuser vent openings 118,120,122,124,126, 128,130,132,134 form a total diffuser vent area of the diffuser 104 equal to about 7.3 square inches (4704 square mm). The first, second and third diffuser vent openings 118,120,122 of the first end section 108 combined have a diffuser vent area equal to about 14% or 1.05 square inches (683 square mm). The fourth, fifth, sixth, seventh and eighth diffuser vent openings 124,126,128,130,132 of the intermediate section 112 together have a diffuser vent area equal to about 65% or 4.75 square inches (3065 square mm). The ninth diffuser vent opening 134 of the second end section 114 has a diffuser vent area equal to about 21% or 1.52 square inches (974 square mm).

Figure 5:
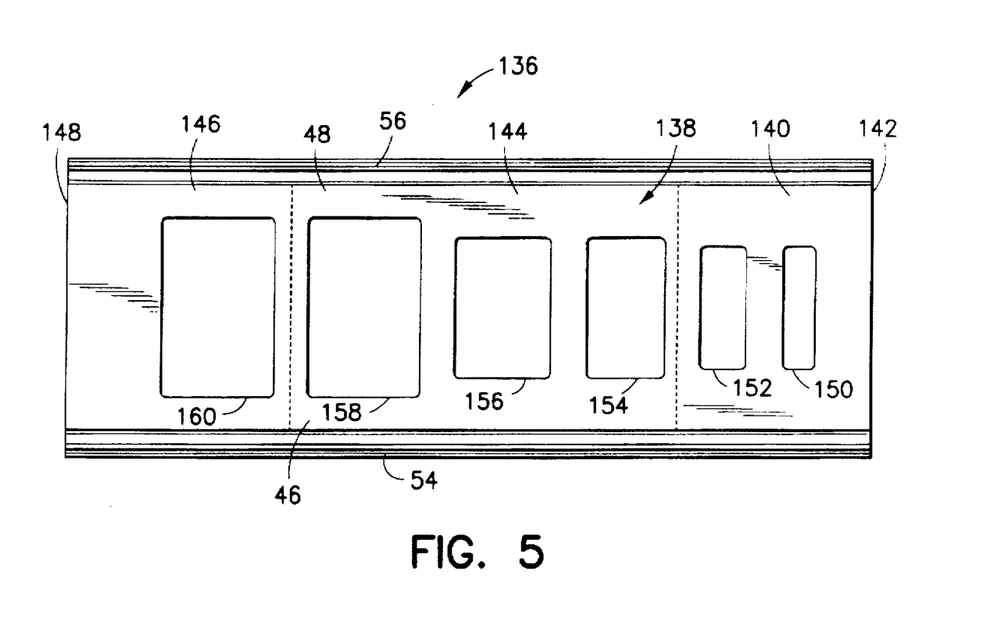
FIG. 5 is a top plan view of an additional diffuser according to the present invention.

Referring to FIG. 5, an additional diffuser 136 according to the present invention is shown. The diffuser 136 is similar to the diffuser 10 of FIGS. 1 and 2 and elements which are the same have the same reference numerals. A diffuser shelf 138 of the diffuser 136 includes a first end section 140 extending from a first diffuser end 142 to an intermediate section 144, which extends to a second end section 146 opposite the first end section and extending to a second diffuser end 148.

The first end section 140 of the diffuser 136 is positionable over the inflation exhaust ports 16 of the elongated inflator 14 and defines first and second diffuser vent openings 150,152. The first diffuser vent opening 150 is spaced from the first diffuser end 142 by 0.7 inch (17.4 mm) and has a length of about 0.4 inch (10.0 mm) and a width of about 1.6 inches (40.0 mm). The second diffuser vent opening 152 is spaced from the first diffuser end 142 by 1.5 inches (38.2 mm) and has a length of about 0.6 inch (15.0 mm) and a width of about 1.6 inches (40.0 mm).

The intermediate section 144 of the diffuser 136 defines third, fourth and fifth diffuser vent openings 154,156,158. The third diffuser vent opening 154 is spaced from the first diffuser end 142 by 2.5 inches (63.7 mm) and has a length of about 1.0 inch (25.4 mm) and a width of about 1.8 inches (45.0 mm). The fourth diffuser vent opening 156 is spaced from the first diffuser end 142 by 3.9 inches (99.3 mm) and has a length of about 1.2 inches (30.0 mm) and a width of about 1.8 inches (45.0 mm). The fifth diffuser vent opening 158 is spaced from the first diffuser end 142 by 5.5 inches (140 mm) and has a length of about 1.4 inches (35.0 mm) and a width of about 2.2 inches (55.0 mm).

The second end section 146 of the diffuser 136 defines a sixth diffuser vent opening 160. The sixth diffuser vent opening 160 is spaced from the first diffuser end 142 by 7.3 inches (185.7 mm) and has a length of about 1.4 inches (35.0 mm) and a width of about 2.2 inches (55.0 mm).

All of the diffuser vent openings 150,152,154,156,158, 160 form a total diffuser vent area of the diffuser 136 equal to about 11.4 square inches (7325 square mm). The first and second diffuser vent openings 150,152 of the first end section 140 combined have a diffuser vent area equal to about 14% or 1.6 square inches (1000 square mm). The third, fourth and fifth diffuser vent openings 154,156,158 of the intermediate section 144 combined have a diffuser vent area equal to about 60% or 6.8 square inches (4400 square mm). The sixth diffuser vent opening 160 of the second end section 146 has a diffuser vent area equal to about 26% or 3.0 square inches (1925 square mm).

Figure 6:
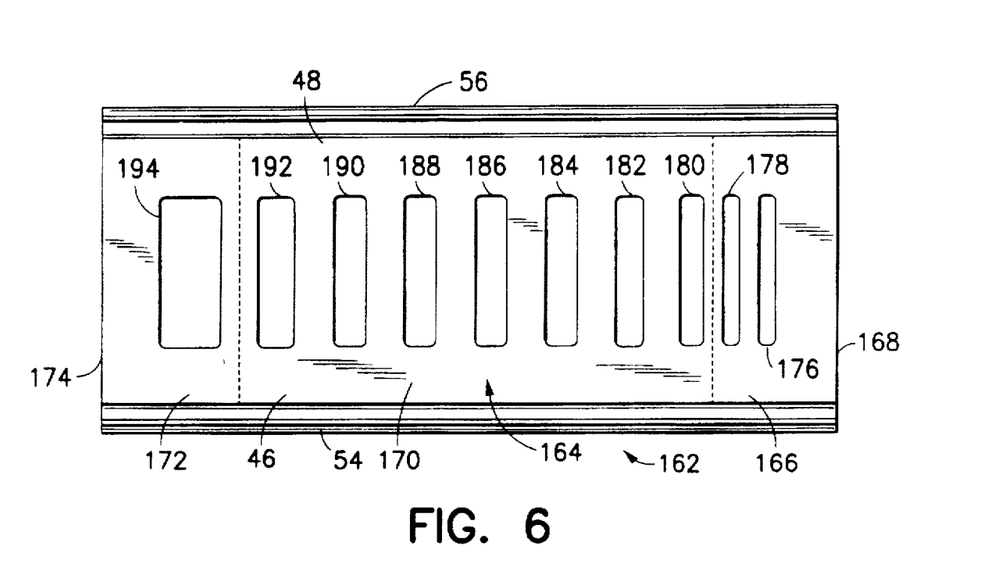
FIG. 6 is a top plan view of further diffuser according to the present invention.

Referring to FIG. 6, a further diffuser 162 according to the present invention is shown. The diffuser 162 is similar to the diffuser 10 of FIGS. 1 and 2 and elements which are the same have the same reference numerals. A diffuser shelf 164 of the diffuser 162 includes a first end section 166 extending from a first diffuser end 168 to an intermediate section 170, which extends to a second end section 172 opposite the first end section and extending to a second diffuser end 174.

The first end section 166 is positionable over the inflation exhaust ports 16 of the elongated inflator 14 and defines first and second diffuser vent openings 176,178. The first and second diffuser vent openings 176,178 each have a length of about 0.2 inch (5.1 mm) and a width of about 1.9 inches (48.3 mm). The first diffuser vent opening 176 is spaced from the first diffuser end 168 by 0.7 inch (17.8 mm), and the second diffuser vent opening 178 is spaced from the first diffuser end by 1.1 inches (27.9 mm).

The intermediate section 170 defines third, fourth, fifth, sixth, seventh, eighth and ninth diffuser vent openings 180,182,184,186,188,190,192. The third diffuser vent opening 180 is spaced from the first diffuser end 168 by 1.475 inches (37.5 mm) and has a length of about 0.25 inch (6.35 mm) and a width of about 1.9 inches (48.3 mm). The fourth diffuser vent opening 182 is spaced from the first diffuser end 168 by 2.2 inches (55.9 mm) and has a length of about 0.3 inch (7.6 mm) and a width of about 1.9 inches (48.3 mm). The fifth, sixth, seventh and eighth diffuser vent openings 184,186,188,190 each have a length of about 0.35 inch (8.9 mm) and a width of about 1.9 inches (48.3 mm). The fifth diffuser vent opening 184 is spaced from the first diffuser end 168 by 2.925 inches (74.3 mm), the sixth diffuser vent opening 186 is spaced from the first diffuser end 168 by 3.825 inches (97.2 mm), the seventh diffuser vent opening 188 is spaced from the first diffuser end 168 by 4.625 inches (117.5 mm), and the eighth diffuser vent opening 190 is spaced from the first diffuser end 168 by 5.425 inches (137.8 mm). The ninth diffuser vent opening 192 is spaced from the first diffuser end 168 by 6.3 inches (160.0 mm) and has a length of about 0.4 inch (10.2 mm) and a width of about 1.9 inches (48.3 mm).

The second end section 172 defines a tenth diffuser vent opening 194. The tenth diffuser vent opening 194 is spaced from the first diffuser end 168 by 7.125 inches (181.0 mm) and has a length of about 0.65 inch (16.5 mm) and a width of about 1.9 inches (48.3 mm).

All of the diffuser vent openings 176,178,180,182,184, 186,188,190,192,194 form a total diffuser vent area of the diffuser 162 equal to about 6.5 square inches (4194 square mm). The first and second diffuser vent openings 176,178 of the first end section 166 combined have a diffuser vent area equal to about 12% or 0.76 square inch (490 square mm). The third, fourth, fifth, sixth, seventh, eighth and ninth diffuser vent openings 180,182,184,186,188,190,192 of the intermediate section 170 combined have a diffuser vent area equal to about 69% or 4.47 square inches (2881 square mm). The tenth diffuser vent opening 194 of the second end section 172 has a diffuser vent area equal to about 19% or 1.24 square inches (797 square mm).

Figure 7:
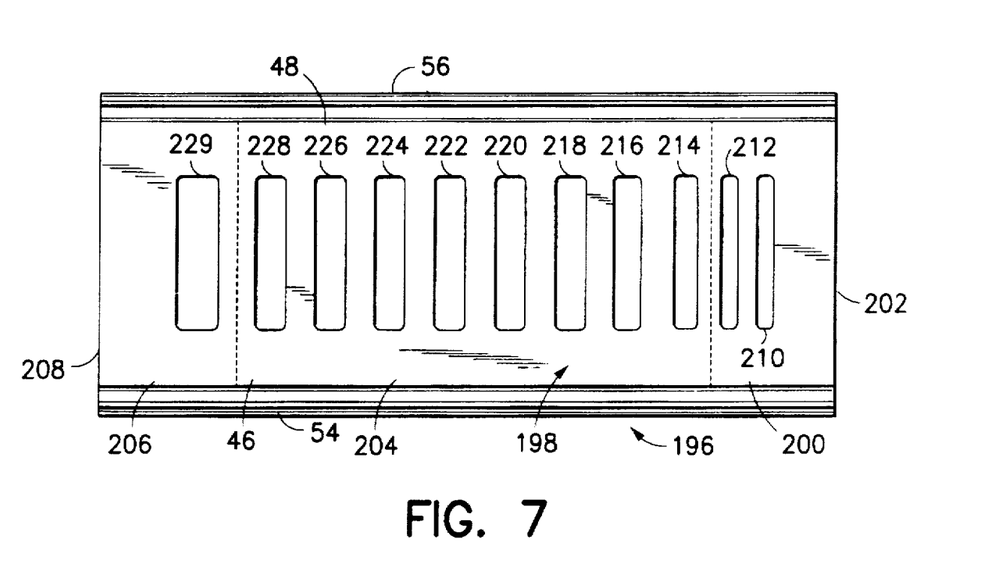
FIG. 7 is a top plan view of yet another diffuser according to the present invention.

Referring to FIG. 7, still another diffuser 196 according to the present invention is shown. The diffuser 196 is similar to the diffuser 10 of FIGS. 1 and 2 and elements which are the same have the same reference numerals. A diffuser shelf 198 of the diffuser 196 includes a first end section 200 extending from a first diffuser end 202 to an intermediate section 204, which extends to a second end section 206 opposite the first end section and extending to a second diffuser end 208.

The first end section 200 is positionable over the inflation exhaust ports 16 of the elongated inflator 14 and defines first and second diffuser vent openings 210,212. The first and second diffuser vent openings 210,212 each have a length of about 0.2 inch (5.1 mm) and a width of about 1.95 inches (49.5 mm). The first diffuser vent opening 210 is spaced from the first diffuser end 202 by 0.7 inch (17.8 mm), and the second diffuser vent opening 212 is spaced from the first diffuser end by 1.1 inches (27.9 mm).

The intermediate section 204 defines third, fourth, fifth, sixth, seventh, eighth, ninth and tenth diffuser vent openings 214,216,218,220,222,224,226,228. The third diffuser vent opening 214 is spaced from the first diffuser end 202 by 1.475 inches (37.5 mm) and has a length of about 0.25 inch (6.35 mm) and a width of about 1.95 inches (49.5 mm). The fourth, fifth and sixth diffuser vent openings 216,218,220 each have a length of about 0.3 inch (7.6 mm) and a width of about 1.95 (49.5 mm). The fourth diffuser vent opening 216 is spaced from the first diffuser end 202 by 2.15 inches (54.6 mm), the fifth diffuser vent opening 218 is spaced from the first diffuser end by 2.8 inches (71.1 mm), and the sixth diffuser vent opening 220 is spaced from the first diffuser end by 3.5 inches (88.9 mm). The seventh, eighth, ninth and tenth diffuser vent openings 222,224,226,228 each have a length of about 0.35 inch (8.9 mm) and a width of about 1.95 inches (49.5 mm). The seventh diffuser vent opening 222 is spaced from the first diffuser end 202 by 4.225 inches (107.3 mm), the eighth diffuser vent opening 224 is spaced from the first diffuser end by 4.925 inches (125.1 mm), the ninth diffuser vent opening 226 is spaced from the first diffuser end by 5.625 inches (144.1 mm), and the tenth diffuser vent opening 228 is spaced from the first diffuser end by 6.485 inches (164.7 mm).

The second end section 206 defines an eleventh diffuser vent opening 229. The eleventh diffuser vent opening 229 is spaced from the first diffuser end 202 by 7.365 inches (187.1 mm) and has a length of about 0.47 inch (11.9 mm) and a width of about 1.95 inches (49.5 mm).

All of the diffuser vent openings 210,212,214,216,218, 220,222,224,226,228,229 form a total diffuser vent area of the diffuser 196 equal to about 6.7 square inches (4323 square mm). The first and second diffuser vent openings 210,212 of the first end section 200 combined have a diffuser vent area equal to about 12% or 0.78 square inch (503 square mm). The third, fourth, fifth, sixth, seventh, eighth, ninth and tenth diffuser vent openings 214,216,218,220,222,224,226, 228 of the intermediate section 204 combined have a diffuser vent area equal to about 74% or 4.97 square inches (3206 square mm). The eleventh diffuser vent opening 229 of the second end section 206 has a diffuser vent area equal to about 14% or 0.9 square inch (594 square mm).

Figure 8:
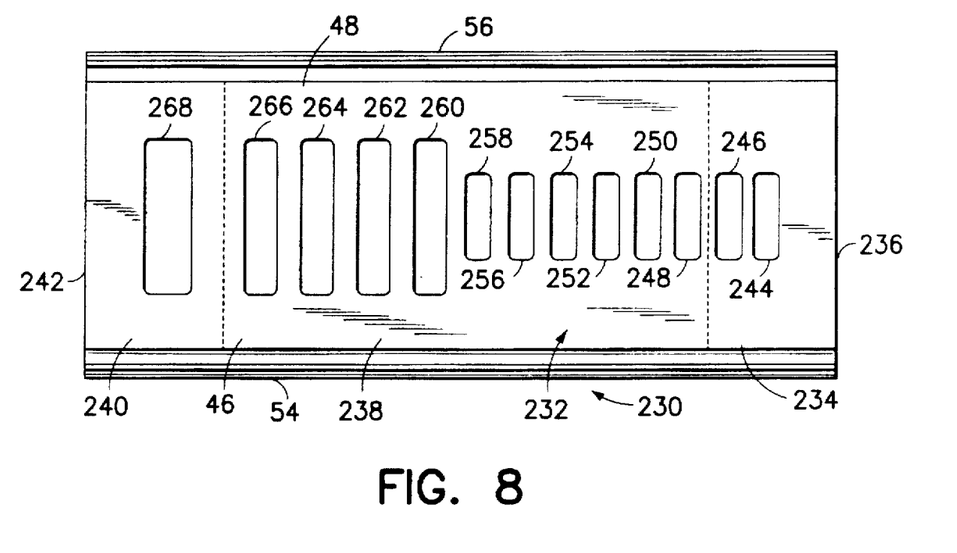
FIG. 8 is a top plan view of an additional diffuser according to the present invention.

Referring to FIG. 8, an additional diffuser 230 according to the present invention is shown. The diffuser 230 is similar to the diffuser 10 of FIGS. 1 and 2 and elements which are the same have the same reference numerals. A diffuser shelf 232 of the diffuser 230 includes a first end section 234 extending from a first diffuser end 236 to an intermediate section 238, which extends to a second end section 240 opposite the first end section and extending to a second diffuser end 242.

The first end section 234 is positionable over the inflation exhaust ports 16 of the elongated inflator 14 and defines first and second diffuser vent openings 244,246. The first and second diffuser vent openings 244,246 each have a length of about 0.22 inch (5.6 mm) and a width of about 1.0 inch (25.4 mm). The first diffuser vent opening 244 is spaced from the first diffuser end 236 by 0.67 inch (17 mm), and the second diffuser vent opening 246 is spaced from the first diffuser end by 1.09 inches (27.7 mm).

The intermediate section 238 defines third, fourth, fifth, sixth, seventh, eighth, ninth, tenth, eleventh and twelfth diffuser vent openings 248,250,252,254,256,258,260,262, 264,266. The third and fourth diffuser vent openings 248, 250 each have a length of about 0.25 inch (6.4 mm) and a width of about 1.0 inch (25.4 mm). The third diffuser vent opening 248 is spaced from the first diffuser end 236 by 1.475 inches (37.5 mm), and the fourth diffuser vent opening 250 is spaced from the first diffuser end by 1.875 inches (47.6 mm). The fifth and sixth diffuser vent openings 252, 254 each have a length of about 0.28 inch (7.1 mm) and a width of about 1.0 inch (25.4 mm). The fifth diffuser vent opening 252 is spaced from the first diffuser end 236 by 2.36 inches (59.9 mm), and the sixth diffuser vent opening 254 is spaced from the first diffuser end by 2.86 inches (72.6 mm). The seventh and eighth diffuser vent openings 256,258 each have a length of about 0.31 inch (7.9 mm) and a width of about 1.0 inch (25.4 mm). The seventh diffuser vent opening 256 is spaced from the first diffuser end 236 by 3.345 inches (85 mm), and the eighth diffuser vent opening 258 is spaced from the first diffuser end by 3.845 inches (97.7 mm). The ninth, tenth, eleventh and twelfth diffuser vent openings 260,262,264,266 each have a length of about 0.34 inch (8.6 mm) and a width of about 1.8 inches (45.7 mm). The ninth diffuser vent opening 260 is spaced from the first diffuser end 236 by 4.38 inches (111.3 mm), the tenth diffuser vent opening 262 is spaced from the first diffuser end by 5.03 inches (127.8 mm), the eleventh diffuser vent opening 264 is spaced from the first diffuser end by 5.68 inches (144.3 mm), and the twelfth diffuser vent opening 266 is spaced from the first diffuser end by 6.33 inches (160.8 mm).

The second end section 240 defines a thirteenth diffuser vent opening 268. The thirteenth diffuser vent opening 268 is spaced from the first diffuser end 236 by 7.30 inches (185.4 mm) and has a length of about 0.5 inch (12.7 mm) and a width of about 1.8 inches (45.7 mm).

All of the diffuser vent openings 244,246,248,250,252, 254,256,258,260,262,264,266,268 form a total diffuser vent area of the diffuser 230 equal to about 5.47 square inches (3529 square mm). The first and second diffuser vent openings 244,246 of the first end section 234 combined have a diffuser vent area equal to about 8% or 0.44 square inch (284 square mm). The third, fourth, fifth, sixth, seventh, eighth, ninth, tenth, eleventh and twelfth diffuser vent openings 248,250,252,254,256,258,260,262,264,266 of the intermediate section 238 combined have a diffuser vent area equal to about 76% or 4.13 square inches (2665 square mm). The thirteenth diffuser vent opening 268 of the second end section 240 has a diffuser vent area equal to about 16% or 0.9 square inch (594 square mm).

The present invention, therefore, provides a novel, simple and effective means for encouraging even inflation of the airbag cushion. Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A diffuser for substantially uniformly diffusing inflation gases into a mouth of an inflatable airbag cushion from an elongated inflator having inflation exhaust ports at only one end thereof, the diffuser comprising:

opposing first and second diffuser ends;

a first end section extending from the first diffuser end, positionable over the inflation exhaust ports of the elongated inflator and defining at least one diffuser vent opening;

an intermediate section extending from the first end section and defining a plurality of diffuser vent openings, each of the plurality of diffuser vent openings being equal or larger than a preceding diffuser vent opening closer to the first end section, with a diffuser vent opening of the plurality of diffuser vent openings of the intermediate section closest to the first end section being equal or larger than the at least one diffuser vent opening of the first end section;

a second end section extending from the intermediate section to the second diffuser end and defining a single diffuser vent opening equal to or larger than a diffuser vent opening of the plurality of diffuser vent openings of the intermediate section closest to the second end section;

the at least one diffuser vent opening of the first end section, the plurality of diffuser vent openings of the intermediate section, and the single diffuser vent opening of the second end section forming a total diffuser vent area of the diffuser;

the at least one diffuser vent opening of the first end section having a diffuser vent area equal to between about eight and about seventeen percent of the total diffuser vent area;

the plurality of diffuser vent openings of the intermediate section combined having a diffuser vent area equal to between about fifty-six and about seventy-nine percent of the total diffuser vent area; and the single diffuser vent opening of the second end section having a diffuser vent area equal to between about thirteen and about twenty-seven percent of the total diffuser vent area.

2. A diffuser according to claim 1 wherein a ratio of the diffuser vent area of the single diffuser vent opening of the second end section and the diffuser vent area of the at least one diffuser vent opening of the first end section is equal to at least one and a half.

3. A diffuser according to claim 2 wherein:

the diffuser vent area of the at least one diffuser vent opening of the first end section equals about seventeen percent of the total diffuser vent area;

the diffuser vent area of the plurality of diffuser vent openings of the intermediate section equals about fifty-seven percent of the total diffuser vent area; and the diffuser vent area of the single diffuser vent opening of the second end section equals about twenty-six percent of the total diffuser vent area.

4. A diffuser according to claim 2 wherein:

the diffuser vent area of the at least one diffuser vent opening of the first end section equals about fourteen percent of the total diffuser vent area;

the diffuser vent area of the plurality of diffuser vent openings of the intermediate section equals about sixty-five percent of the total diffuser vent area; and the diffuser vent area of the single diffuser vent opening of the second end section equals about twenty-one percent of the total diffuser vent area.

5. A diffuser according to claim 2 wherein:

the diffuser vent area of the at least one diffuser vent opening of the first end section equals about fourteen percent of the total diffuser vent area;

the diffuser vent area of the plurality of diffuser vent openings of the intermediate section equals about sixty percent of the total diffuser vent area; and the diffuser vent area of the single diffuser vent opening of the second end section equals about twenty-six percent of the total diffuser vent area.

6. A diffuser according to claim 2 wherein:

the diffuser vent area of the at least one diffuser vent opening of the first end section equals about twelve percent of the total diffuser vent area;

the diffuser vent area of the plurality of diffuser vent openings of the intermediate section equals about sixty-nine percent of the total diffuser vent area; and the diffuser vent area of the single diffuser vent opening of the second end section equals about nineteen percent of the total diffuser vent area.

7. A diffuser according to claim 2 wherein:

the diffuser vent area of the at least one diffuser vent opening of the first end section equals about eight percent of the total diffuser vent area;

the diffuser vent area of the plurality of diffuser vent openings of the intermediate section equals about seventy-six percent of the total diffuser vent area; and the diffuser vent area of the single diffuser vent opening of the second end section equals about sixteen percent of the total diffuser vent area.

8. A diffuser according to claim 1 wherein the at least one diffuser vent opening of the first end section comprises at least two diffuser vent openings, with each of said at least two diffuser vent openings being equal or larger than a preceding diffuser vent opening of said at least two diffuser vent openings closer to the first diffuser vent end.

9. A diffuser according to claim 1 wherein the intermediate section is longer than the first end section and longer than the second end section.

10. A diffuser according to claim 1 wherein:

the diffuser vent area of the at least one diffuser vent opening of the first end section equals about twelve percent of the total diffuser vent area;

the diffuser vent area of the plurality of diffuser vent openings of the intermediate section equals about seventy-four percent of the total diffuser vent area; and the diffuser vent area of the single diffuser vent opening of the second end section equals about fourteen percent of the total diffuser vent area.

11. A diffuser for diffusing inflation gas into an inflatable airbag cushion from an elongated inflator having inflation exhaust ports at only one end thereof, the diffuser comprising:

a longitudinal length from a first end section through an intermediate section to a second end section;

the first end section positionable over the inflation exhaust ports of the elongated inflator and defining at least one diffuser vent opening;

the intermediate section defining a plurality of diffuser vent openings, each of the plurality of diffuser vent openings being equal or larger than a preceding diffuser vent opening closer to the first end section, with a diffuser vent opening of the plurality of diffuser vent openings of the intermediate section closest to the first end section being equal or larger than the at least one diffuser vent opening of the first end section;

the second end section defining a single diffuser vent opening equal to or larger than a diffuser vent opening of the plurality of diffuser vent openings of the intermediate section closest to the second end section;

the at least one diffuser vent opening of the first end section, the plurality of diffuser vent openings of the intermediate section, and the single diffuser vent opening of the second end section forming a total diffuser vent area of the diffuser;

the at least one diffuser vent opening of the first end section having a diffuser vent area equal to between about eight and about seventeen percent of the total diffuser vent area;

the plurality of diffuser vent openings of the intermediate section combined having a diffuser vent area equal to between about fifty-six and about seventy-nine percent of the total diffuser vent area; and the single diffuser vent opening of the second end section having a diffuser vent area equal to between about thirteen and about twenty-seven percent of the total diffuser vent area.

12. A diffuser according to claim 11 wherein a ratio of the diffuser vent area of the single diffuser vent opening of the second end section and the diffuser vent area of the at least one diffuser vent opening of the first end section is equal to at least one and a half.

13. A diffuser according to claim 11 wherein the at least one diffuser vent opening of the first end section comprises at least two diffuser vent openings, with each of said at least two diffuser vent openings being equal or larger than a preceding diffuser vent opening of said at least two diffuser vent openings further from the intermediate section.

14. A diffuser according to claim 11 wherein the intermediate section is longer than the first end section and longer than the second end section.

15. An airbag module comprising:

A) an elongated, generally trough-shaped module housing having a bottom wall, and a pair of opposing endwalls and a pair of opposing sidewalls extending upwardly from the bottom wall and forming an open top;

B) a folded, inflatable airbag cushion having an open mouth for receiving inflation gas, the airbag cushion mounted within the module housing adjacent the open top of the module housing;

C) an elongated inflator for providing inflation gas for inflating the airbag cushion, the elongated inflator extending between the opposing endwalls of the module housing adjacent the bottom wall and defining a plurality of inflation exhaust ports at a first end thereof;

D) a diffuser extending between the opposing sidewalls of the module housing above the inflator and below the open mouth of the folded, inflatable airbag cushion, the diffuser including, 1) opposing first and second diffuser ends extending between the opposing endwalls of the module housing so that the diffuser encloses the inflator within the module housing;

2) a first end section extending from the first diffuser end and positioned over the inflation exhaust ports of the elongated inflator, the first end section defining at least one diffuser vent opening;

3) an intermediate section extending from the first end section and defining a plurality of diffuser vent openings, each of the plurality of diffuser vent openings being equal or larger than a preceding diffuser vent opening closer to the first end section, with a diffuser vent opening of the plurality of diffuser vent openings of the intermediate section closest to the first end section being equal or larger than the at least one diffuser vent opening of the first end section;

4) a second end section extending from the intermediate section to the second diffuser end and defining a single diffuser vent opening equal to or larger than a diffuser vent opening of the plurality of diffuser vent openings of the intermediate section closest to the second end section;

5) the at least one diffuser vent opening of the first end section, the plurality of diffuser vent openings of the intermediate section, and the single diffuser vent opening of the second end section forming a total diffuser vent area of the diffuser;

6) the at least one diffuser vent opening of the first end section having a diffuser vent area equal to between about eight and about seventeen percent of the total diffuser vent area;

7) the plurality of diffuser vent openings of the intermediate section combined having a diffuser vent area equal to between about fifty-six and about seventy-nine percent of the total diffuser vent area; and 8) the single diffuser vent opening of the second end section having a diffuser vent area equal to between about thirteen and about twenty-seven percent of the total diffuser vent area.

16. An airbag module according to claim 15 wherein the inflator is a hybrid inflator.

17. An airbag module according to claim 15 wherein a ratio of the diffuser vent area of the single diffuser vent opening of the second end section and the diffuser vent area of the at least one diffuser vent opening of the first end section is equal to at least one and a half.

18. An airbag module according to claim 15 wherein the at least one diffuser vent opening of the first end section comprises at least two diffuser vent openings, with each of said at least two diffuser vent openings being equal or larger than a preceding diffuser vent opening of said at least two diffuser vent openings closer to the first diffuser end.

19. An airbag module according to claim 15 wherein the intermediate section of the diffuser is longer than the first end section and longer than the second end section.

* * * * *